United States Patent [19]
Plichta et al.

[11] Patent Number: 4,818,647
[45] Date of Patent: Apr. 4, 1989

[54] METHOD OF MAKING A CATHODE FOR USE IN A RECHARGEABLE LITHIUM BATTERY, CATHODE SO MADE, AND RECHARGEABLE LITHIUM BATTERY INCLUDING THE CATHODE

[75] Inventors: Edward J. Plichta, Freehold; Mark Salomon, Fairhaven, both of N.J.

[73] Assignee: The United States of America as represented by the Secretary of the Army, Washington, D.C.

[21] Appl. No.: 28,169

[22] Filed: Mar. 20, 1987

[51] Int. Cl.⁴ ............................................ H01M 4/58
[52] U.S. Cl. .................................... 429/218; 429/217; 429/194
[58] Field of Search ............... 429/217, 218, 194, 199; 29/623.1

[56] References Cited
U.S. PATENT DOCUMENTS 3,317,347  5/1967  Coleman et al. .................... 429/217
3,415,687  12/1968  Methlie ............................... 429/198

FOREIGN PATENT DOCUMENTS 2600638    7/1976  Fed. Rep. of Germany ...... 429/217
55-43761   3/1980  Japan .................................. 429/217
55-196557  7/1980  Japan .................................. 429/217
57-76752   5/1982  Japan .................................. 429/217

OTHER PUBLICATIONS $Li_xCoO_2 (0<X\leq 1)$: "A New Cathode Material For Batteries of High Energy Density" by K. Mizushima, P. C. Jones, P. J. Wiseman and J. B. Goodenough, Mat. Res. Bull., 15, 783 (1980).

"New Layered Structure Obtained by Electrochemical Deintercalation of the Metastable $LiCoO_2$ (02) Variety" by A. Mendiboure, C. Delmas and P. Hagenmuller, Mat. Res. Bull., 19, 1383 (1984).

Primary Examiner—Brian E. Hearn
Assistant Examiner—Stephen J. Kalafut
Attorney, Agent, or Firm—Sheldon Kanars; Roy E. Gordon

[57] ABSTRACT

A cathode is made for a rechargeable $Li/Li_xCoO_2$ cell using an aqueous cathode preparation. The $Li/LiAsF_6$-$MA/Li_xCoO_2$ system can deliver between 230-170 Wh/kg at current densities of 2-10 mA/cm².

2 Claims, 2 Drawing Sheets

METHOD OF MAKING A CATHODE FOR USE IN A RECHARGEABLE LITHIUM BATTERY, CATHODE SO MADE, AND RECHARGEABLE LITHIUM BATTERY INCLUDING THE CATHODE

The invention described herein may be manufactured, used, and licensed by or for the Government for governmental purposes without the payment to us of any royalty thereon.

This invention relates to a method of making $Li_xCoO_2$ ($0 \leq x \leq 1$) as the cathode for use in a rechargeable lithium battery, to a cathode so made, and to a rechargeable lithium battery including the cathode.

BACKGROUND OF THE INVENTION

The use of $Li_xCoO_2$ ($0 \leq x \leq 1$) as the cathode in a rechargeable lithium cell was first proposed by Mizushima et al in the article "A New Cathode Material For Batteries Of High Energy Density" by K. Mizushima, P.C. Jones, P.J. Wiseman and J.B. Goodenough, Mat. Res. Bull., 15, 783 (1980). The layered rock salt structure of $Li_xCoO_2$ can theoretically intercalate one mole of lithium per mole of oxide at cell voltages of 4V or greater; and deliver energy densities in excess of 1000 Wh/kg. Since the initial report on this high energy cathode by Mizushima et al, the $Li/Li_xCoO_2$ cell remained a curiosity, due undoubtedly, to its characteristically high cathode potentials which results in solvent oxidation. Mendiboure et al in the article "New Layered Structure Obtained by Electrochemical Deintercalation of the Metastable $LiCoO_2$ (02) Variety" by A. Mendiboure, C. Delmas and P. Hagenmuller, Mat. Res. Bull., 19, 1383 (1984) reported some cycling data for this high energy couple in lithium perchlorate-propylene carbonate solutions, but their work mainly focused on the phase transitions occurring within $Li_xCoO_2$. Mendiboure et al reported the upper stability of their electrolyte as 4V which is not sufficiently high enough to be used practically in the $Li/Li_xCoO_2$.

SUMMARY OF THE INVENTION

The general object of this invention is to provide a universal lithium battery that can be used in a large number of configurations thereby reducing battery proliferation. A more particular object of the invention is to provide a rechargeable lithium battery capable of delivering superior cell performance over previously described cell systems with $Li_xCoO_2$ as the cathode.

It has now been found that the aforementioned objects can be attained by providing an electrochemical cell comprised of an alkali metal anode, a cathode including 80 weight percent lithium cobalt dioxide ($Li_xCoO_2$ where $0 \leq x \leq 1$) as the active material with 10 weight percent polytetrafluorethylene (PTFe) as the binder with an electrolyte containing 1.5 to 2.0M lithium hexafluoroarsenate ($LiAsF_6$) as the solute and methyl acetate (MA) as the solvent.

The cathode mixture including the active material, conductive diluent, and emulsified binder is prepared as a dough with additions of a wetting agent of 3:1 water-isopropyl alcohol solution. The cathode dough is roll pressed between two polymer sheets as for example, Mylar onto both sides of an expanded aluminum screen and is sintered at 280° C. under vacuum for 1 hour. This cathode preparation produces a cathode structure having excellent flexibility and a high porosity of at least 50 percent. This $Li_xCoO_2$ cathode preparation in conjunction with the $LiAsF_6$-MA electrolyte enables the electrochemical cell of $Li/LiAsF_6$-$MA/Li_xCoO_2$ to be used as a practical rechargeable battery. The use of an aqueous cathode preparation has not been suggested heretofore in the manufacture of a $Li_xCoO_2$ cathode. X-ray diffraction spectra of both water soaked $Li_xCoO_2$ and the untreated material are identical showing the insensitivity of moisture on the material. Also, since the $Li_xCoO_2$ is prepared in air, the cathode preparation can be performed under non-specialized manufacturing environments thus eliminating the requirement of a costly low humidity room or inert gas filled glove box.

The results using MA solutions with $Li/Li_xCoO_2$ indicate rate capabilities, low temperature performance, and cycle life to be excellent. In all cycling studies presented hereinafter, cells are always charged at 0.5 $mA/cm^2$ at 25° C. while the discharge rate and temperatures are varied.

DESCRIPTION OF THE DRAWING AND THE PREFERRED EMBODIMENT

FIG. 1 shows the initial charge/discharge of $Li/Li_xCoO_2$ in 2.4 M $LiAsF_6$-MA at 25° C. and a discharge rate of 2.0 $mA/cm^2$. The potential-capacity curve for lower rates are identical to those for the $2mA/cm^2$ discharge rate. The initial OCV is 3.07V.

Figure 1:
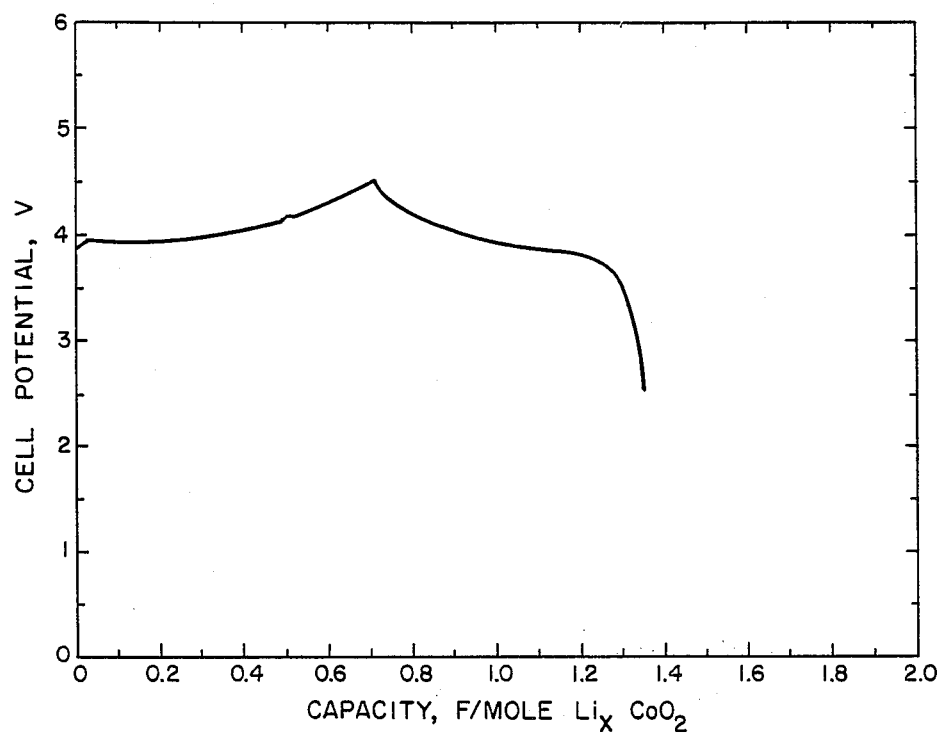
Figure 2:
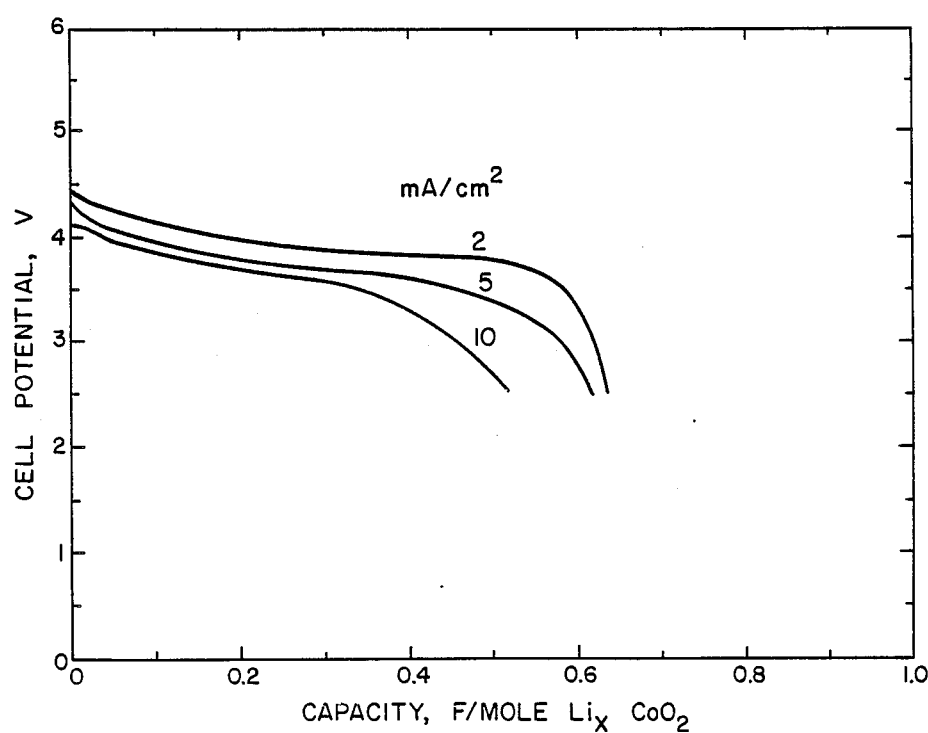
FIG. 2 shows the ratio capability of the $Li/2.4M$ $LiAsF_6$-$MA/Li_xCoO_2$ cell at 25° C. All curves are initial discharges except for 10 $mA/cm^2$ which is measured on the second discharge cycle.
Figure 3:
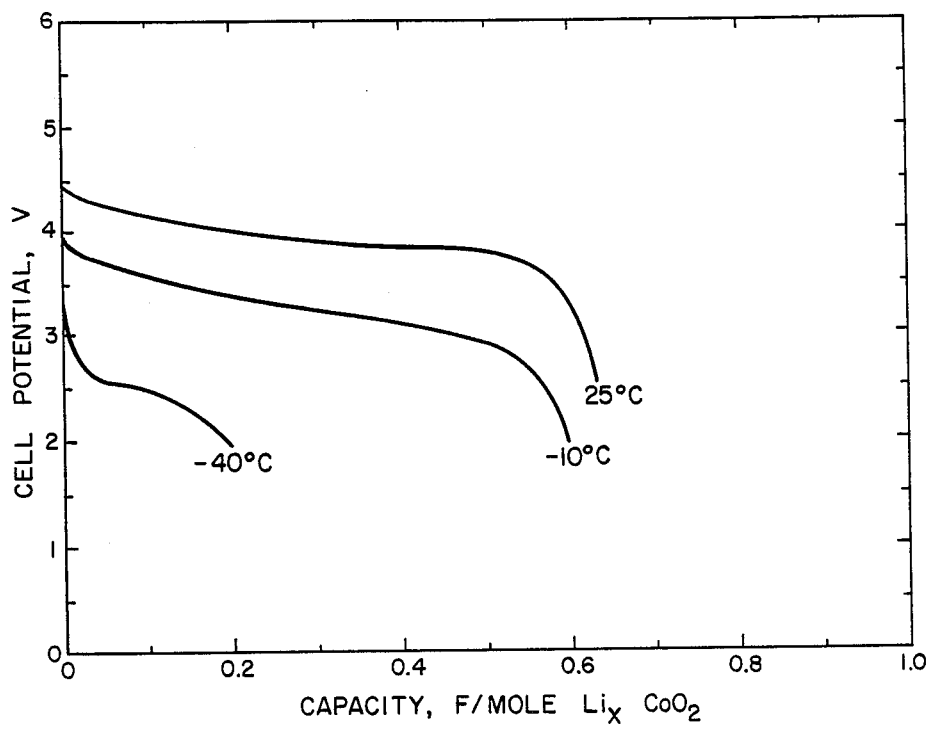
FIG. 3 shows the effect of temperature at a constant discharge rate of 2.0 $mA/cm^2$. 25° C. and −10° C. results are for the initial discharge, and −40° C. results are obtained on the second discharge.

A numerical summary of the data shown in FIGS. 1 to 3 is given in Table 1. The data in this table shows that the $Li/LiAsF_6$-$MA/Li_xCoO_2$ system is not only capable of delivery rates up to 10 $mA/cm^2$, but can do so over the wide temperature range of −40° C. to 25° C.

TABLE 1

| | Discharge results for first and second cycle | | | |
|---|---|---|---|---|
| t/°C. | discharge rate $mA/cm^2$ | capacity F/mol | cutoff voltage V | average discharge potential (V) | energy[a] density Wh/kg |
| 25 | 1.0–2.0 | 0.64 | 2.5 | 3.90 | 688 |
| 25 | 5.0 | 0.62 | 2.5 | 3.70 | 633 |
| 25 | 10.0 | 0.53 | 2.5 | 3.60 | 517 |
| −10 | 2.0 | 0.60 | 2.0 | 3.30 | 603 |
| −40 | 2.0 | 0.20 | 2.0 | 2.50 | 135 |

[a]Experimental energy densities are based on mass of active material.

Figure 4:
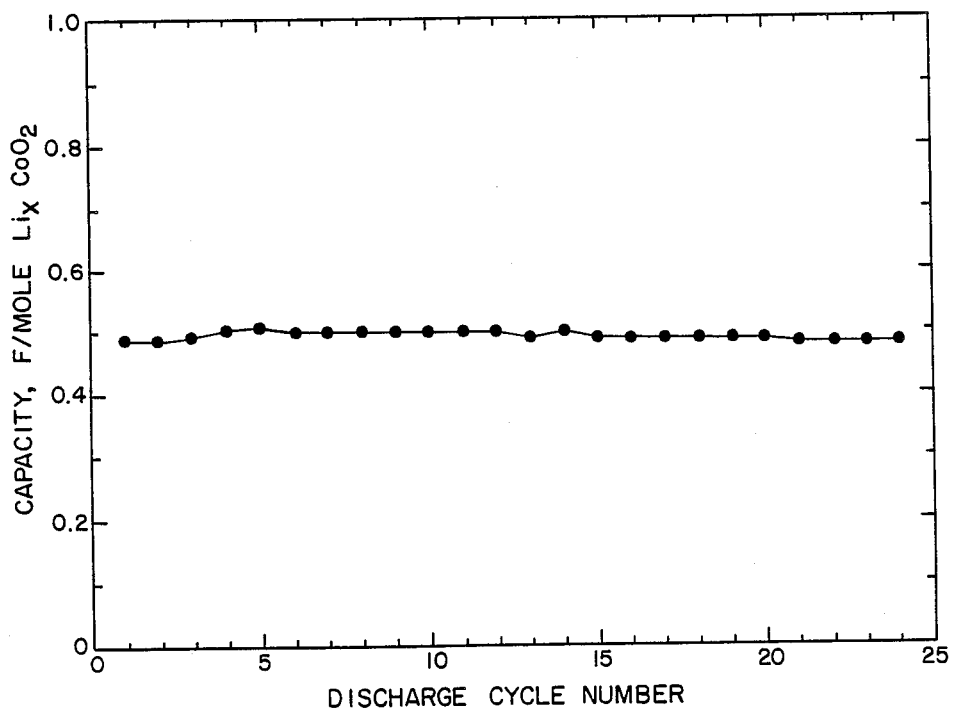

FIG. 4 shows the relation between capacity and cycle number of a $Li/1.7M$ $LiAsF_6$-$MA/Li_xCoO_2$ cell where the temperature is constant at 25° C. and the discharge rate is fixed at 2.0 $mA/cm^2$. The potential limits are set at 4.3V to 2.5V with no interruptions during cycling. The cell delivers better than 98 percent cycling efficiency based on the initial charge capacity over 20 cycles. No significant loses in capacity are observed over these conditions suggesting excellent electrochemical stability of the systems at these potentials.

The cell components are also tested for chemical stability by high temperature storage at 71° C. over a 30-day period. No visible degration of any component is observed, and atomic absorption studies for cobalt solubilities are favorable, with only trace amounts of cobalt (10 ppm) found present in solution.

These results far exceed those reported for Li/Li$_x$CoO$_2$ in other electrolytes and demonstrate the superior performance of the Li/LiAsF$_6$-MA/Li$_x$CoO$_2$ systems. Using the experimental energy densities based on active materials (Table 1) and assuming an additional 33 percent loss when going to a practical rechargeable cell, it is estimated that the Li/LiAsF$_6$-MA/Li$_x$CoO$_2$ system can deliver between 230 to 170 Wh/kg at current densities of 2 to 10 mA/cm$^2$. At a discharge rate of 20 mA/cm$^2$, it is estimated that practical energy densities of 200 Wh/kg and 45 Wh/kg are feasible at temperatures of $-10°$ C. and $-40°$ C. respectively.

We wish it understood that we do not desire to be limited to the exact detailed described for obvious modifications will occur to a person skilled in the art.

What is claimed is:

1. A rechargeable lithium battery comprising lithium as the anode, a cathode having a porosity of at least 50 percent and prepared from a cathode mixture of about 80 weight percent lithium cobalt dioxide (Li$_x$CoO$_2$ where $0 \leq x \leq 1$), about 10 weight percent Shawinigan carbon black, and about 10 weight percent polytetrafluoroethylene as a dough with additions of an aqueous wetting agent and roll pressing the cathode dough between two Mylar sheets onto both sides of an expanded aluminum screen and sintering at about 280° C. under vacuum for about 1 hour, and 1.5 to 2.0M LiAsF$_6$ in methyl acetate as the electrolyte.

2. A rechargeable lithium battery according to claim 1 wherein the wetting agent is about 3:1 water:isopropyl alcohol solution.

* * * * *